United States Patent
Chung

(10) Patent No.: US 11,612,141 B2
(45) Date of Patent: Mar. 28, 2023

(54) RETRACTABLE LEASH WITH AUTOMATIC LOCKING AND UNLOCKING FUNCTION

(71) Applicant: Wing Yin Chung, Kwun Tong (HK)

(72) Inventor: Wing Yin Chung, Kwun Tong (HK)

( * ) Notice: Subject to any disclaimer, the term of this patent is extended or adjusted under 35 U.S.C. 154(b) by 571 days.

(21) Appl. No.: 16/720,008

(22) Filed: Dec. 19, 2019

(65) Prior Publication Data
US 2020/0205380 A1    Jul. 2, 2020

(30) Foreign Application Priority Data

Dec. 27, 2018  (DE) .................. 20 2018 107 429.6

(51) Int. Cl.
*A01K 27/00* (2006.01)
*B65H 75/44* (2006.01)
*B65H 75/48* (2006.01)

(52) U.S. Cl.
CPC ....... *A01K 27/004* (2013.01); *B65H 75/4431* (2013.01); *B65H 75/486* (2013.01)

(58) Field of Classification Search
CPC .............. B65H 75/486; B65H 75/4418; B65H 75/4428; B65H 75/4431; A01K 27/004
See application file for complete search history.

(56) References Cited

U.S. PATENT DOCUMENTS

| | | | | |
|---|---|---|---|---|
| 7,374,123 | B2* | 5/2008 | Han | A45F 5/004 242/385.2 |
| 8,651,411 | B2* | 2/2014 | Wang | A01K 27/004 119/796 |
| 10,051,841 | B2* | 8/2018 | O'Brien | B65H 75/4431 |
| 11,033,003 | B1* | 6/2021 | Burkhardt | B65H 75/486 |
| 2008/0054116 | A1* | 3/2008 | Han | B65H 75/4431 242/385.2 |
| 2008/0105779 | A1* | 5/2008 | Han | A45F 5/004 242/386 |

* cited by examiner

*Primary Examiner* — Sang K Kim

(57) ABSTRACT

A retractable leash with automatic locking and unlocking function including a housing, a spool with a cord wound therearound, a braking means, a cord opening, a stopping means and a biasing means. A second portion of the stopping means abuts against the cord in such a way that tensioning of the cord by an external force actuates the stopping means to overcome biasing force of the biasing means to rotate to the locking position, and untensioning of the cord by the external force returns the stopping means from the locking position to the unlocking position. The present invention automatically locks the leash when the dog rushes, thus improving safety of the leash.

7 Claims, 3 Drawing Sheets

RETRACTABLE LEASH WITH AUTOMATIC LOCKING AND UNLOCKING FUNCTION

BACKGROUND OF THE INVENTION

The present invention relates to a retractable leash and more particularly pertains to a retractable leash with automatic locking and unlocking function.

Retractable leashes are widely available in the marketplace. However, many of the retractable leashes require users to manually press a button to lock the leash. If the dog rushes suddenly and the user somehow fails to press the button to lock the leash, this could be dangerous as the user may not be able to control the dog and the dog may eventually injure other people or run into danger (e.g. roads with cars driving by). It is also possible that before the user could press the button to lock the leash, the dog has already reached the end of the cord and is jerked to a stop, resulting in spinal injury to the dog.

BRIEF SUMMARY OF THE INVENTION

In view of the aforesaid disadvantages now present in the prior art, the object of the present invention is to provide a retractable leash with automatic locking and unlocking function which is capable of automatically locking the leash when the dog rushes, thus improving safety of the leash.

To attain this, the present invention generally comprises:
a housing;
a spool disposed inside the housing and with a cord wound therearound, wherein the spool is rotatable in either an unwinding direction to unwind the cord from the spool and a winding direction to wind the cord around the spool, and the spool is biased towards the winding direction;
a braking means provided on the spool;
a cord opening on the housing through which the cord exits the housing;
a stopping means disposed inside the housing between the spool and the cord opening and rotatable between a locking position where a first portion of the stopping means engages with the spool and cooperates with the braking means to stop rotation of the spool towards the unwinding direction and an unlocking position where the stopping means is disengaged from the spool and the spool is rotatable towards either the unwinding direction or the winding direction;
a biasing means which biases the stopping means towards the unlocking position;
wherein a second portion of the stopping means abuts against the cord in such a way that tensioning of the cord by an external force actuates the stopping means to overcome biasing force of the biasing means to rotate to the locking position, and untensioning of the cord by the external force returns the stopping means from the locking position to the unlocking position.

The present invention further comprises a manual stopping means operable between an activated position and a deactivated position and biased towards the deactivated position; a portion of the manual stopping means is adapted to push the first portion of the stopping means towards the locking position at the activated position.

The manual stopping means is in form of a press button with a first end exposed outside the housing and a second end disposed inside the housing; the second end of the press button is positioned adjacent to the first portion of the stopping means when the stopping means is at the unlocking position and the press button is at the deactivated position, and the second end of the press button pushes the first portion of the stopping means towards the locking position at the activated position.

The braking means on the spool is in form of ratchet teeth disposed at an outer perimeter of the spool.

The stopping means is rotatable about a rod positioned between the first portion and the second portion of the stopping means; the biasing means is a torsion spring wound around the rod with a first end of the torsion spring abutting against the second portion of the stopping means.

The spool has a top side and a bottom side which are both disposed with identical ratchet teeth at outer perimeters thereof; the first portion of the stopping means is in form of a clamp with a top extension and a bottom extension connected by a vertical member; the top extension and the bottom extension is adapted to extend into the outer perimeter of the top side and the bottom side of the spool respectively to cooperate with the ratchet teeth of the top side and the bottom side respectively at the locking position.

The second portion of the stopping means is in form of a cylinder.

The first portion and the second portion of the stopping means form an obtuse angle such that at the unlocking position both the first portion and the second portion of the stopping means are close to the spool.

DETAILED DESCRIPTION OF THE INVENTION

Figure 1:
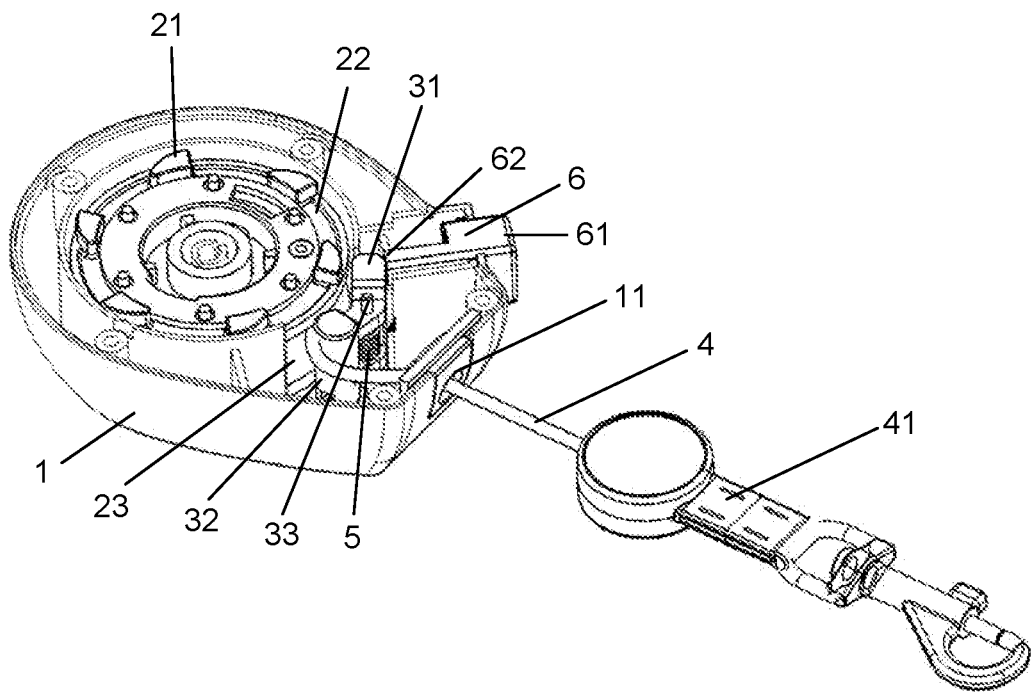
FIG. 1 is a perspective view of an embodiment of the present invention with a portion of the housing removed when the stopping means is at the unlocking position.
Figure 2:
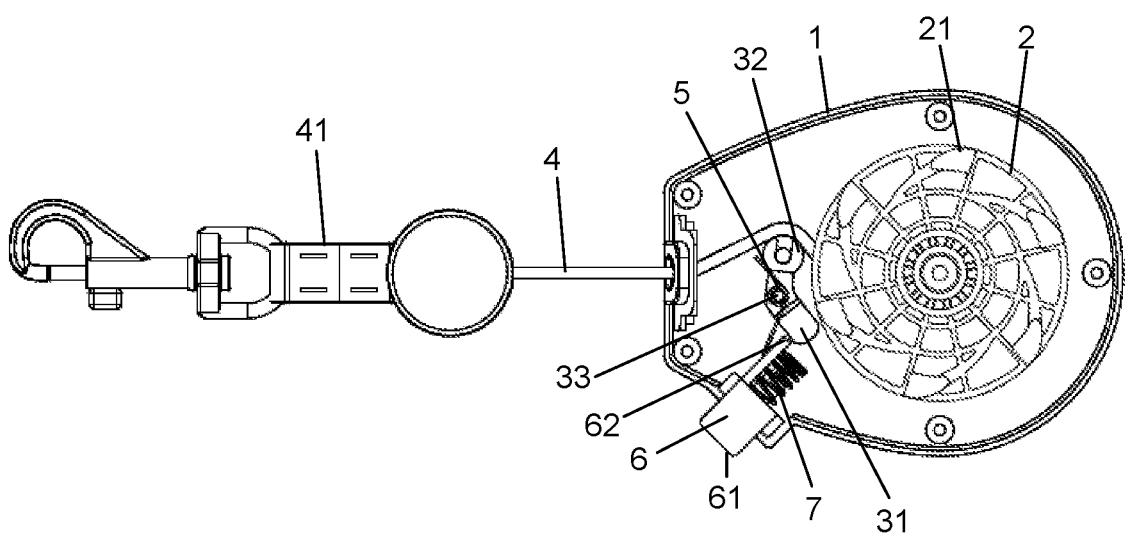
FIG. 2 is a schematic view of the embodiment as shown in FIG. 1 with a portion of the housing removed when the stopping means is at the unlocking position.
Figure 3:
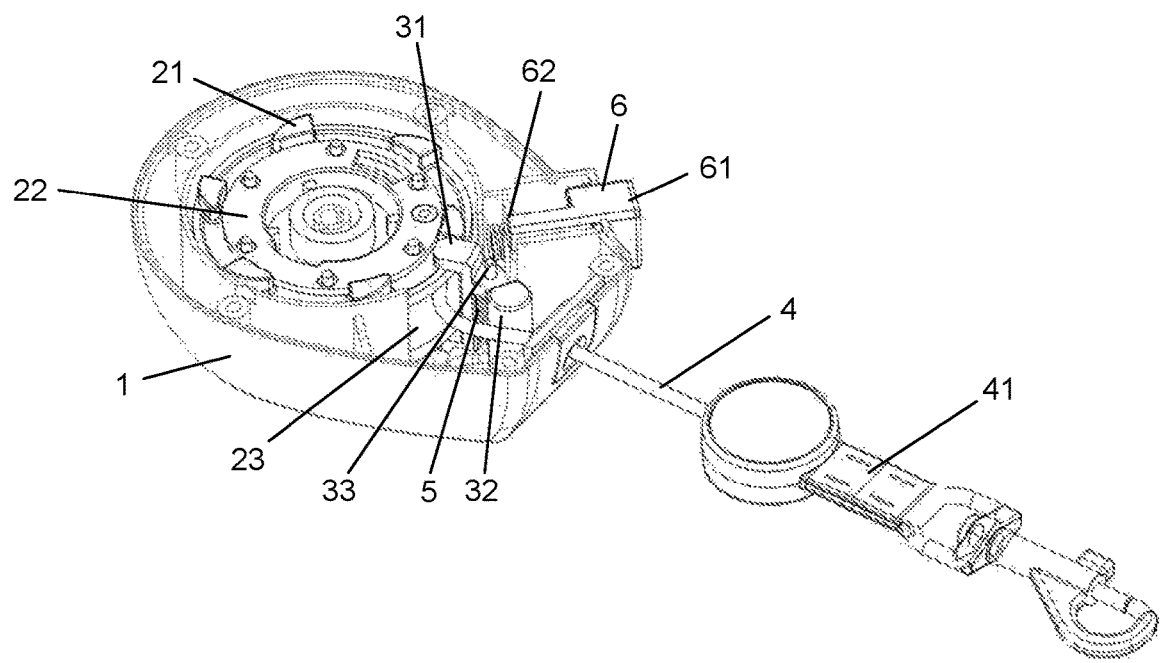
FIG. 3 is a perspective view of the embodiment as shown in FIG. 1 with a portion of the housing removed when the stopping means is at the locking position.
Figure 4:
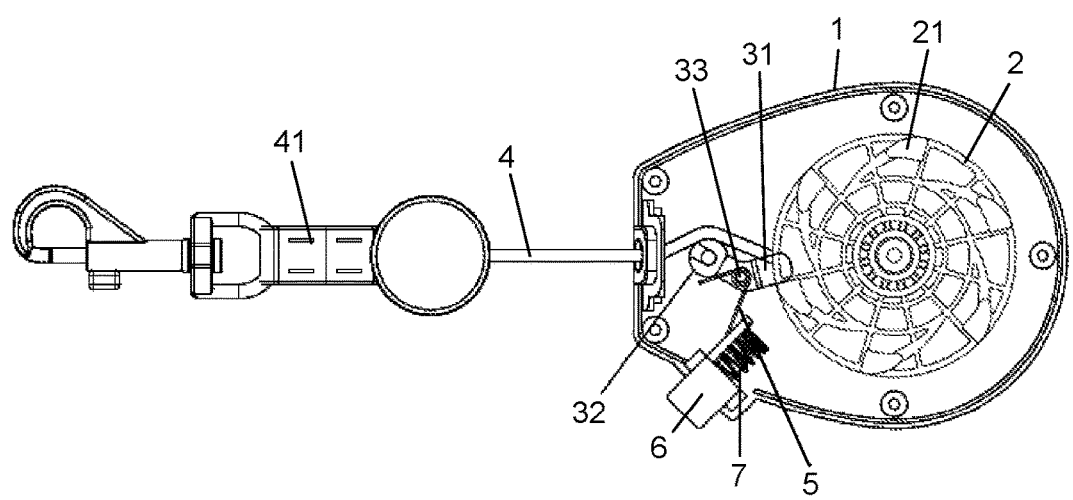
FIG. 4 is a schematic view of the embodiment as shown in FIG. 1 with a portion of the housing removed when the stopping means is at the locking position.
Figure 5:
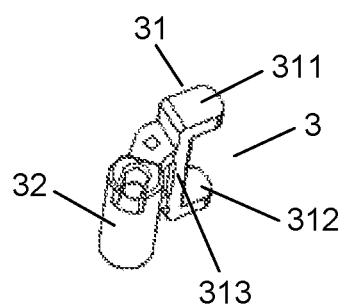
FIG. 5 is a perspective view of the stopping means of the embodiment as shown in FIG. 1.

As illustrated in FIGS. 1 to 5, the present embodiment comprises a housing 1, a spool 2, and a stopping means 3.

The spool 2 is disposed inside the housing 1 and with a cord 4 wound therearound. The spool 2 is rotatable in either an unwinding direction to unwind the cord 4 from the spool 2 or a winding direction to wind the cord 4 around the spool 2, and the spool 2 is biased towards the winding direction in conventional manner known in the art. A braking means in form of ratchet teeth 21 disposed at an outer perimeter of the spool 2 in this embodiment is provided on the spool 2. The spool 2 has a top side 22 and a bottom side 23 which are both disposed with identical ratchet teeth 21 at outer perimeters thereof. The cord 4 exits the housing 1 through a cord opening 11 on the housing 1 and connects to an attaching means 41 for attaching to a dog collar or the like.

The stopping means 3 is disposed inside the housing 1 between the spool 2 and the cord opening 11. In this embodiment, the stopping means 3 has a first portion which is in form of a clamp 31 with a top extension 311 and a bottom extension 312 connected by a vertical member 313, and a second portion which is in form of a cylinder 32. The stopping means 3 is rotatable about a rod 33 positioned between the first portion being the clamp 31 and the second portion being the cylinder 32 between a locking position and an unlocking position. At the locking position, the first portion being the clamp 31 engages with the spool 2 and cooperates with the braking means being the ratchet teeth 21 to stop rotation of the spool 2 towards the unwinding direction. More particularly, the top extension 311 and the bottom extension 312 extend into the outer perimeter of the top side 22 and the bottom side 23 of the spool 2 respectively to cooperate with the ratchet teeth 21 of the top side 22 and the bottom side 23 respectively. At the unlocking position, the stopping means 3 is disengaged from the spool 2 and the spool 2 is rotatable towards either the unwinding direction or the winding direction. The first portion being the clamp 31 and the second portion being the cylinder 32 of the stopping means 3 form an obtuse angle such that at the unlocking position both the clamp 31 and the cylinder 32 are close to the spool 2. The stopping means 3 is biased by a biasing means being a torsion spring 5 in this embodiment towards the unlocking position. The torsion spring 5 winds around the rod 33 with a first end of the torsion spring 5 abutting against the second portion being the cylinder 32 of the stopping means 3.

The second portion being the cylinder 32 of the stopping means 3 abuts against the cord 4 in such a way that tensioning of the cord 4 by an external force actuates the stopping means 3 to overcome the biasing force of the biasing means being the torsion spring 5 to rotate to the locking position, and untensioning of the cord 4 by the external force returns the stopping means 3 from the locking position to the unlocking position. More particularly, when the retractable leash of the present embodiment is fastened to a dog collar of a dog, if the dog walks at normal speed and does not rush, similar to conventional retractable leash in the marketplace, the cord 4 winds or unwinds on the spool 2 depending on the distance between the dog and the user, and the cord 4 is not tensioned to an extent which exerts sufficient force to the stopping means 3 to actuate the stopping means 3 to overcome the biasing force of the biasing means being the torsion spring 5 to rotate to the locking position. However, when the dog rushes, the cord 4 is tensioned and thus a force is exerted on the cylinder 32 to push the cylinder 32 to overcome the biasing force of the torsion spring 5 to rotate to the locking position, thereby causing the top extension 311 and the bottom extension 312 to extend into the outer perimeter of the top side 22 and the bottom side 23 of the spool 2 respectively; when the top extension 311 and the bottom extension 312 come into contact with one of the ratchet teeth 21 on the top side 22 and the bottom side 23 of the spool respectively, the top extension 311 and the bottom extension 312 stops the spool 2 from rotating further towards the unwinding direction, thus the dog is stopped from being rushing further away from the user. When the dog stops rushing, the cord 4 is no longer tensioned and thus no sufficient force is exerted on the cord 4 for the cord 4 to overcome the biasing force of the torsion spring 5; the stopping means 3 is biased by the torsion spring 5 to return to the unlock position where it is disengaged from the spool 2. The spool 2 is then rotatable towards either the winding direction or the unwinding direction, depending on the distance between the dog and the user. In this way, the retractable leash of the present invention is capable of automatically stopping the dog from rushing, thus improving safety of the leash. The retractable leash of the present invention is convenient to use as the stopping means 3 automatically returns from the locking position to the unlocking position when the dog stops rushing, without the need of the user to manually press any button.

In this embodiment, to provide the user with the flexibility to manually stop the rotation of the spool 2, the retractable leash further comprises a press button 6 operable between an activated position and a deactivated position with a first end 61 exposed outside the housing 1 and a second end 62 disposed inside the housing 1. The press button 6 is biased by a coil spring 7 towards the deactivated position. The second end 62 of the press button 6 is positioned adjacent to the first portion being the clamp 31 of the stopping means 3 when the stopping means 3 is at the unlocking position and the press button 6 is at the deactivated position, and the second end 62 of the press button pushes the clamp 31 of the stopping means 3 towards the locking position at the activated position. In this way, even when the dog does not rush, if the user wishes to stop the unwinding of the cord 4, the user may simply press the press button 6. Since the press button 6 is biased by the coil spring 7 towards the deactivated position, once the user releases the press button 6, the cord 4 will be allowed to wind or unwind depending on the distance between the dog and the user.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:
1. A retractable leash with automatic locking and unlocking function comprising
   a housing;
   a spool disposed inside the housing and with a cord wound therearound, wherein the spool is rotatable in either an unwinding direction to unwind the cord from the spool and a winding direction to wind the cord around the spool, and the spool is biased towards the winding direction;
   a braking means provided on the spool;
   a cord opening on the housing through which the cord exits the housing;
   a stopping means disposed inside the housing between the spool and the cord opening and rotatable between a locking position where a first portion of the stopping means engages with the spool and cooperates with the braking means to stop rotation of the spool towards the unwinding direction and an unlocking position where the stopping means is disengaged from the spool and the spool is rotatable towards either the unwinding direction or the winding direction;
   a biasing means which biases the stopping means towards the unlocking position;
   wherein a second portion of the stopping means abuts against the cord in such a way that tensioning of the cord by an external force actuates the stopping means to overcome biasing force of the biasing means to rotate to the locking position, and untensioning of the cord by the external force returns the stopping means from the locking position to the unlocking position;
   the retractable leash with automatic locking and unlocking function also comprises a manual stopping means operable between an activated position and a deactivated position and biased towards the deactivated position; a portion of the manual stopping means is adapted to push the first portion of the stopping means towards the locking position at the activated position.

2. The retractable leash with automatic locking and unlocking function as in claim 1, wherein the manual stopping means is in form of a press button with a first end exposed outside the housing and a second end disposed inside the housing; the second end of the press button is positioned adjacent to the first portion of the stopping means when the stopping means is at the unlocking position and the press button is at the deactivated position, and the second end of the press button pushes the first portion of the stopping means towards the locking position at the activated position.

3. The retractable leash with automatic locking and unlocking function as in claim 1, wherein the braking means on the spool is in form of ratchet teeth disposed at an outer perimeter of the spool.

4. The retractable leash with automatic locking and unlocking function as in claim 3, wherein the spool has a top side and a bottom side which are both disposed with identical ratchet teeth at outer perimeters thereof; the first portion of the stopping means is in form of a clamp with a top extension and a bottom extension connected by a vertical member; the top extension and the bottom extension is adapted to extend into the outer perimeter of the top side and the bottom side of the spool respectively to cooperate with the ratchet teeth of the top side and the bottom side respectively at the locking position.

5. The retractable leash with automatic locking and unlocking function as in claim 1, wherein the stopping means is rotatable about a rod positioned between the first portion and the second portion of the stopping means; the biasing means is a torsion spring wound around the rod with a first end of the torsion spring abutting against the second portion of the stopping means.

6. The retractable leash with automatic locking and unlocking function as in claim 1, wherein the second portion of the stopping means is in form of a cylinder.

7. The retractable leash with automatic locking and unlocking function as in claim 1, wherein the first portion and the second portion of the stopping means form an obtuse angle such that at the unlocking position both the first portion and the second portion of the stopping means are close to the spool.

* * * * *